Jan. 7, 1964 P. H. GARDHOUSE 3,116,708
MULTIPLE HULL WATER CRAFT
Filed March 11, 1963 4 Sheets-Sheet 2
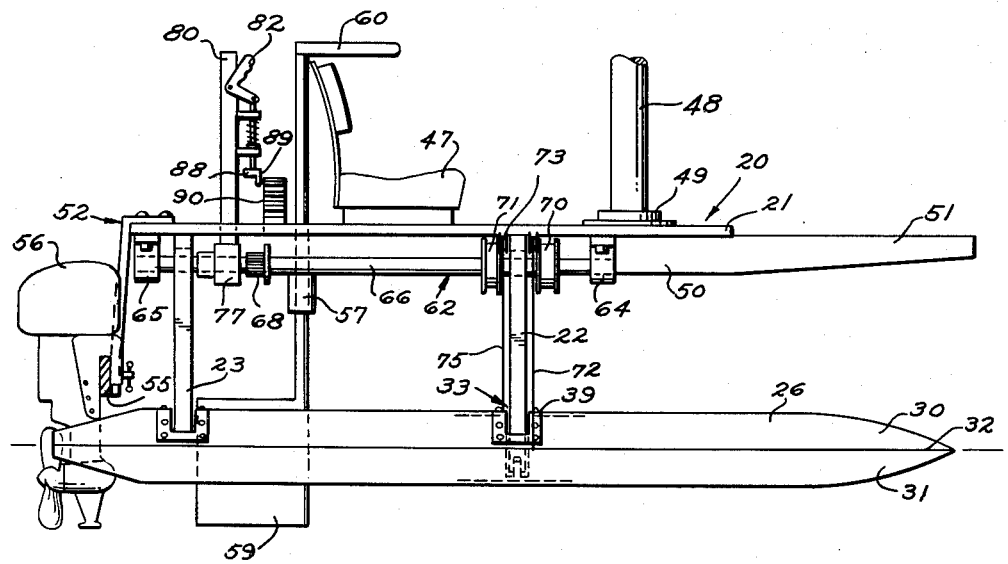
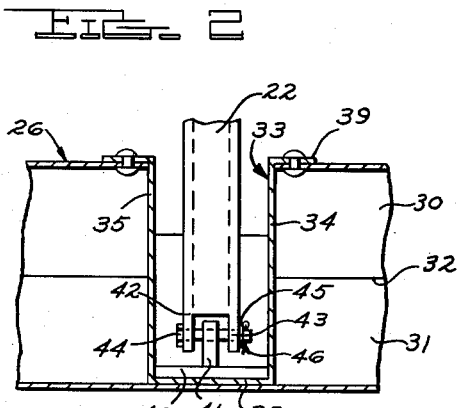
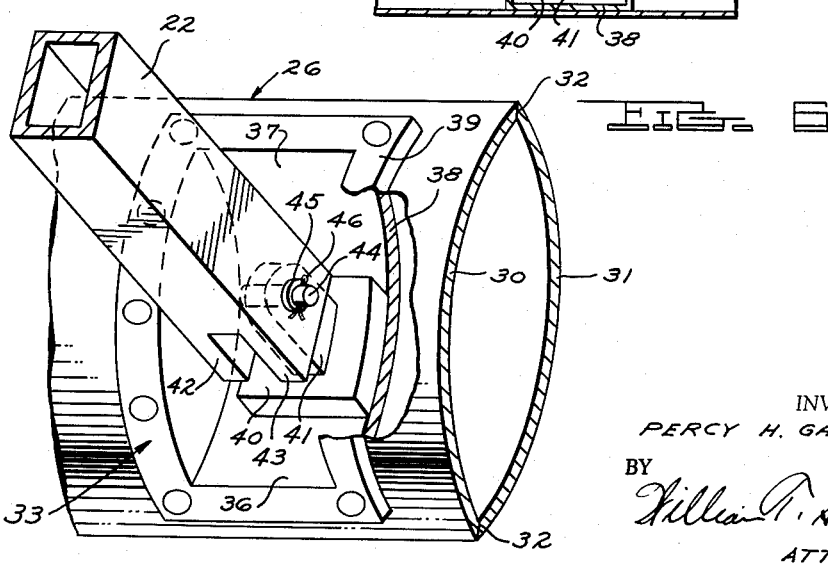
INVENTOR.
PERCY H. GARDHOUSE
BY
William P. Sevald
ATTORNEY

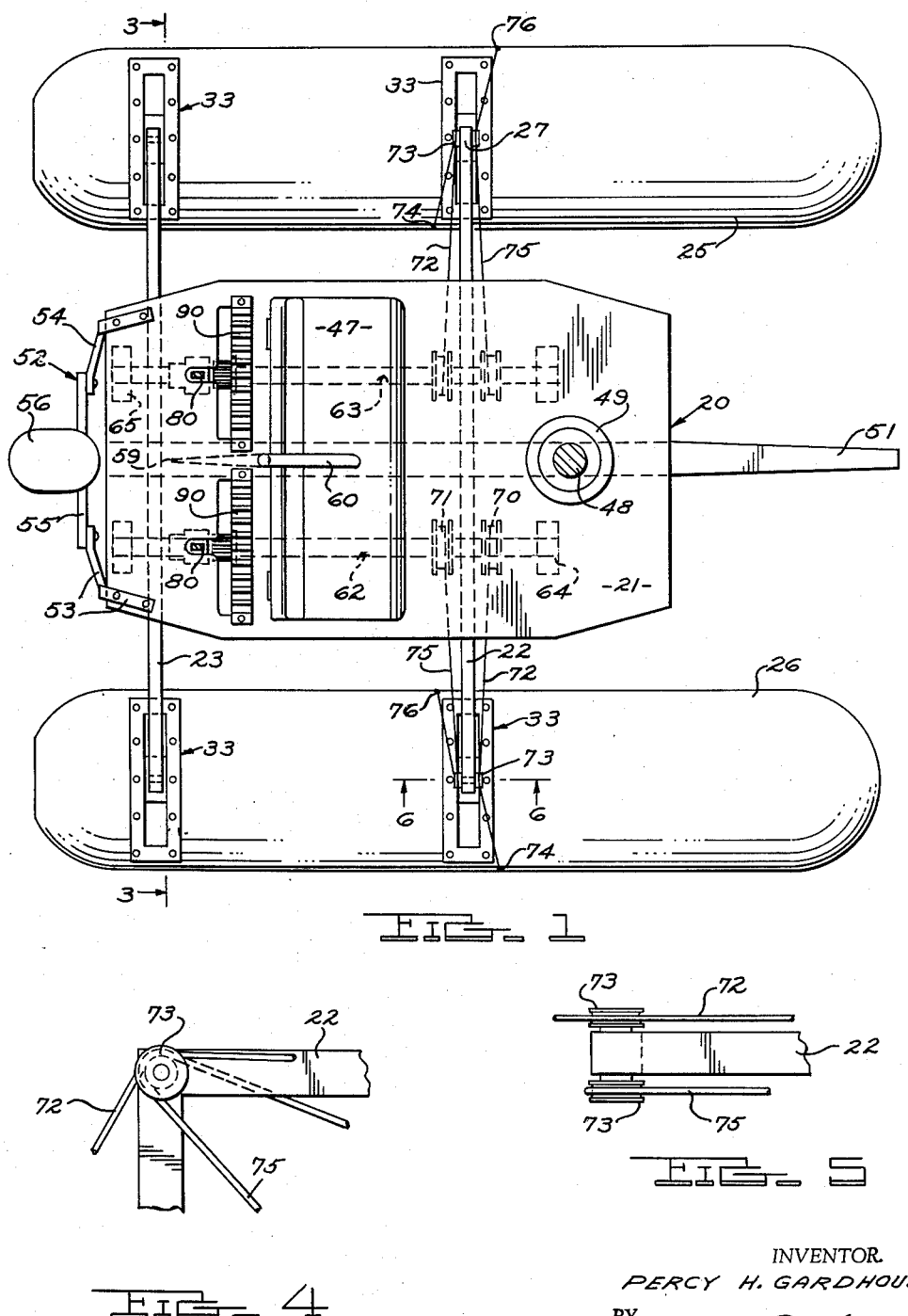

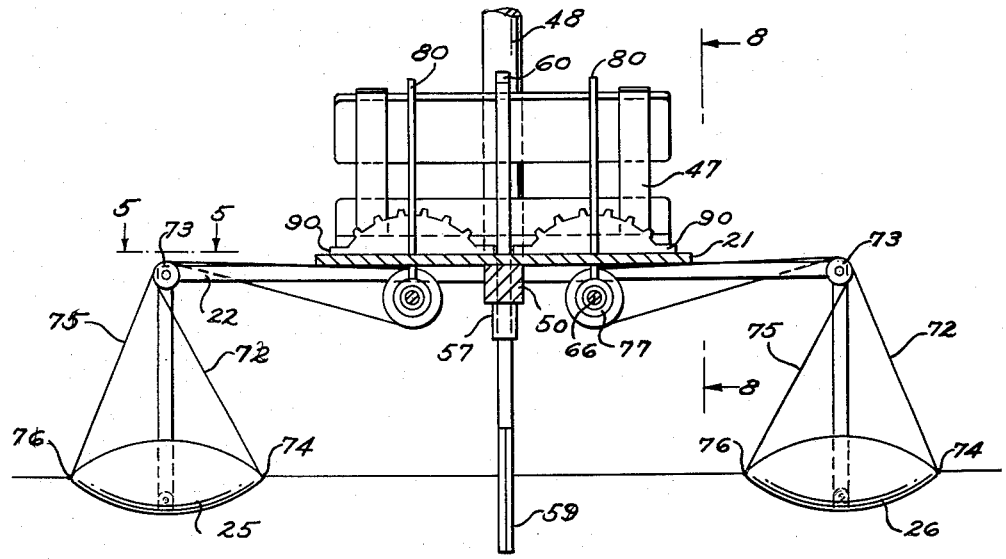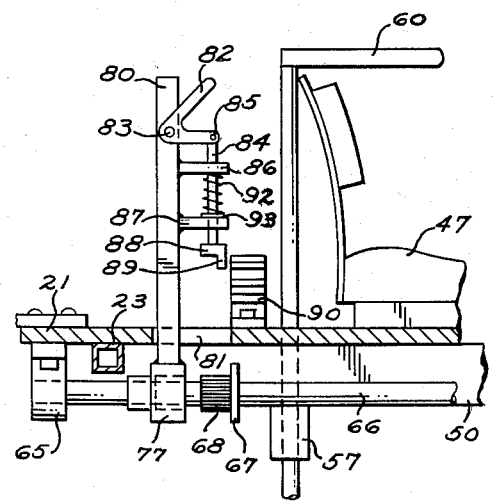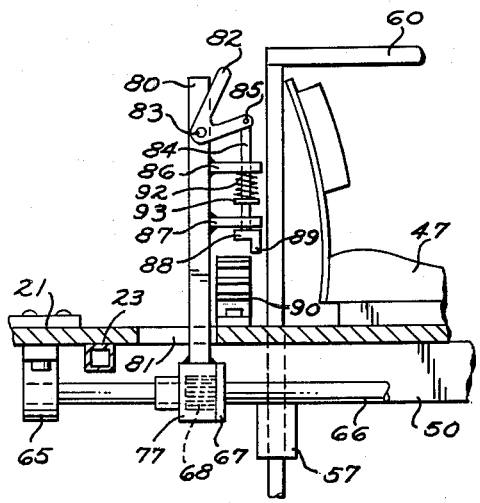

Jan. 7, 1964  P. H. GARDHOUSE  3,116,708
MULTIPLE HULL WATER CRAFT
Filed March 11, 1963  4 Sheets-Sheet 4
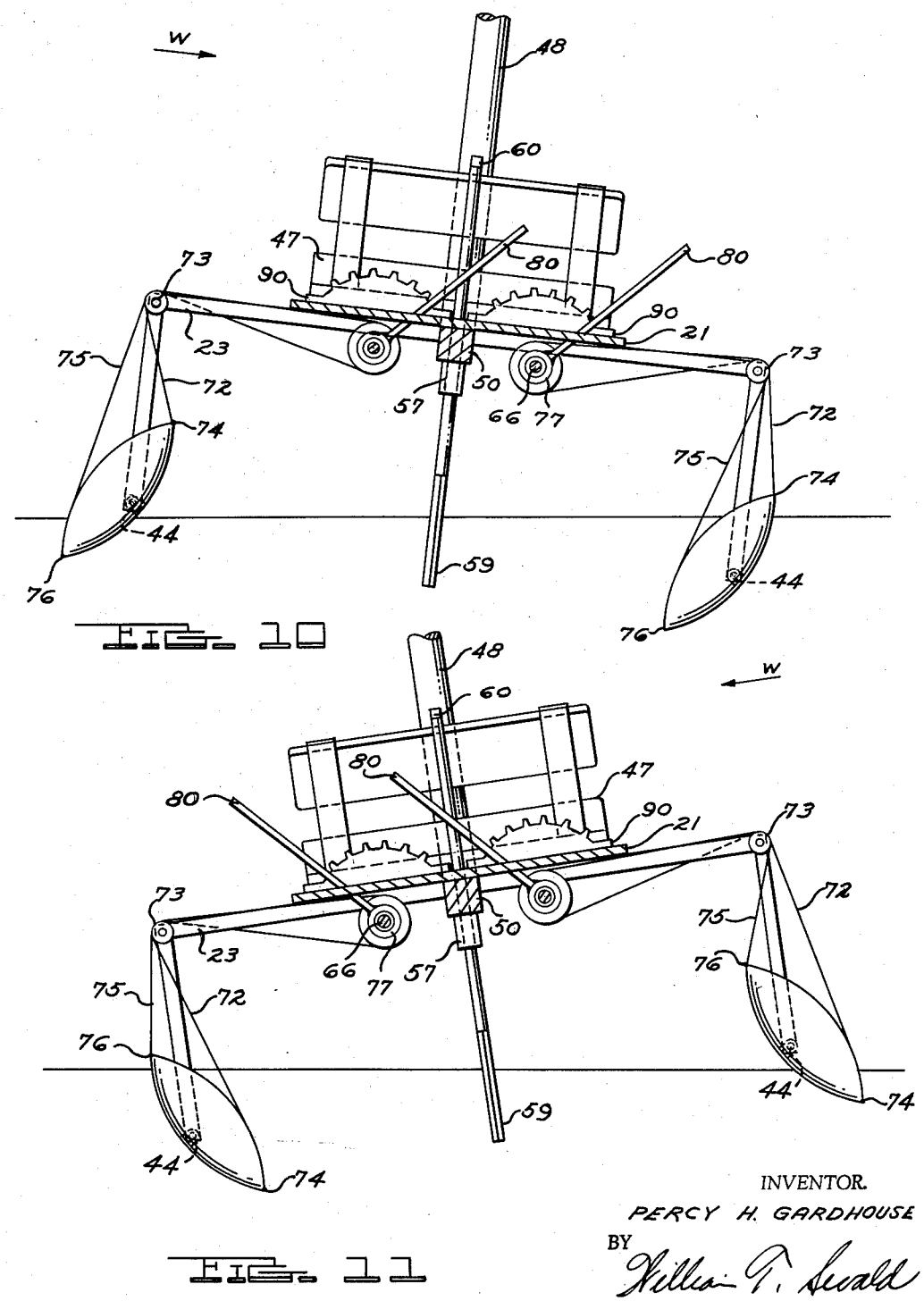
INVENTOR.
PERCY H. GARDHOUSE
BY
ATTORNEY

United States Patent Office 3,116,708
Patented Jan. 7, 1964

3,116,708
MULTIPLE HULL WATER CRAFT
Percy H. Gardhouse, 25251 Brookview Drive,
Farmington, Mich.
Filed Mar. 11, 1963, Ser. No. 264,407
9 Claims. (Cl. 114—61)

This invention relates to multiple hull water craft such as catamarans. The invention pertains particularly to a double hulled water craft wherein the hulls are pivotally connected to the interconnecting cross members for sidewise rocking movement. The hulls may pivot freely or may be controlled at a pivotal angle as desired.

Multiple hull water craft such as catamarans and outriggers have been employed extensively because of their stability, dryness, and relative inexpensive construction compared to their size. However, the several devices of the prior art have not proven entirely satisfactory as the hulls are fixed in position and therefore are not movable from one position to another position. The fixed hull is designed for a particular purpose. The hulls may be designed as a shallow planing type for motor propulsion or as a deep keel type for sail propulsion.

The planing type hull is not suitable for sailing because it has no resistance to side-slip and the keel type hull is not suitable for motor propulsion because of its depth and water plowing action. The planing type hull has no sidewise water resistance to hold against the wind and thus is unusable under sail at an angle in the wind. The keel type hulls are deep and have a water plowing action which throws a bow wave from each hull towards the other causing a high double bow wave in the middle of the craft which increases water resistance.

With the foregoing in view, it is a primary object of the invention to provide a multiple hull water craft having hulls which are pivotally mounted for side-to-side angular motion so that they are selectable positionable in a planing position and in a keel position.

An object of the invention is to provide a pivotal connection between the hulls and the interconnecting cross members so that the hulls may move relative to the cross members in a side-to-side pivotal motion to suit various conditions.

An object of the invention is to provide a pivotal connection between the hulls and the cross members so that the hulls may rock from side-to-side with compensating action relative to waves of water.

An object of the invention is to provide a pivotal connection adjacent the bottom of the hull which adds to hull stability by placing the load at the bottom of the hull permitting the hull to assume a natural buoyant position relative to water regardless of the angular position of the cross member.

An object of the invention is to provide hulls which are relatively shallow from top to bottom and which are relatively wide from side-to-side.

An object of the invention is to provide relatively wide shallow draft hulls pivotally connected adjacent their bottoms to the cross members so that the hulls plane on the water in foreward motion under motor propulsion.

An object of the invention is to provide wide shallow hulls pivotally connected at their bottoms so that in turns the motor thrust against the hull moves the bottom of the hull sidewardly in one direction with the water resistance pushing the top of the hull in the opposite direction so that the hull pivots and assumes a sideward planing posture.

An object of the invention is to provide relatively wide shallow hulls for foreward planing in conjunction with sail propulsion to achieve a planing effect when running before the wind and at slight angles to the wind.

An object of the invention is to provide shallow wide hulls which have a curved top and bottom meeting at their lateral edges at the sides so that when their side-to-side axis is substantially horizontal they are relatively shallow draft for planing effect and so that when their side-to-side axis is relatively vertical they are relatively deep draft for keel effect.

An object of the invention is to provide wide hulls which have a curved top and bottom meeting in a lateral edge at the sides so that their maximum water displacement and buoyancy is immediately effective when their side-to-side axis is substantially horizontal resulting in shallow draft for planing and so that their minimum water displacement and buoyancy is immediately effective when their side-to-side axis is substantially vertical resulting in deep draft for keel effect.

An object of the invention is to provide means for mechanically swinging and holding the hulls sidewardly to convert from a relatively horizontal planing position to a relatively vertical keel effect position for sailing at an angle to the wind.

An object of the invention is to provide means for sidewardly tilting the pivotally mounted hulls from a relatively flat planing position to a relatively angular keel position singly or in combination with each other and to provide means for securing the hulls in the adjusted angular position.

An object of the invention is to provide a hull shape which is dynamically designed for both the planing position and the keel position so that when the hull is positioned substantially on edge, the top and bottom of the hull each present like surfaces relative to the water.

An object of the invention is to provide hulls which are dynamically designed for both the planing and keel positions to eliminate the collective bow wave between the hulls.

These and other objects of the invention will become apparent with reference to the following description of a water craft embodying the invention taken in connection with the accompanying drawings in which:

FIG. 1 is a top-plan view of a double hull or catamaran water craft embodying the invention showing the mast in cross-section.

FIG. 2 is a side-elevational view of the water craft seen in FIG. 1.

FIG. 3 is a rear-elevational view of the device as seen in FIGS. 1 and 2 with the motor mount and motor removed.

FIG. 4 is an enlarged fragmentary view of the cable arrangement on the cross member for swinging the hulls from the planing position to the keel position.

FIG. 5 is a top-plan view of the elements seen in FIG. 4.

FIG. 6 is an enlarged partial longitudinal cross-sectional view of the pivot construction between the hull and the cross member.

FIG. 7 is an enlarged partial perspective view of a hull showing the pivot housing in more detail.

FIG. 8 is a partial cross-sectional view of the cable operating mechanism taken on the line 8—8 of FIG. 3 illustrating a different position.

FIG. 9 is a view similar to FIG. 8 showing the operating mechanism in a different position.

FIG. 10 is a view similar to FIG. 3 showing the hulls in the keel position sailing on a starboard tack; and FIG. 11 is a view similar to FIG. 10 showing the hulls in the keel position sailing on a port tack.

Referring now to the drawings wherein like numerals refer to like and corresponding parts throughout the several views, the multiple hull craft disclosed therein to illustrate the invention comprises the catamaran 20 having a center deck 21 supported on a pair of cross members 22 and 23. The cross members are pivotally connected to a pair of hulls 25 and 26.

The pivotal connection of the cross members 22 and 23 with the hulls 25 and 26 is made adjacent the bottoms of the hulls as shown in FIG. 6. With the pivot in this location, sidewardly directed motor propelling force on the deck 21 urges the cross members sidewardly pushing the bottom of the hulls 25 and 26 sidewardly against the water resistance at the side of the hull. The sideward opposition between propelling force and water resistance causes the hull to pivot sidewardly and present its bottom surface at a planing angle relative to the water.

In straight ahead motion under sail or motor, the hull may be allowed to pivot with wave motion or be held stationary as desired. On tacks under sail, the hulls are pivoted and held so as to present their bottoms sidewardly at a water plowing angle to gain keel effect to prevent side slipping.

More particularly, the hulls 25 and 26 preferably are made of like top and bottom halves 30 and 31 and joined at a center line 32. The hulls 25 and 26 may be molded fiber glass, plywood, aluminum or other suitable material.

A pair of pivot well members 33 are disposed through the top half 30 of each hull. The member 30 includes opposite end walls 34 and 35, opposite side walls 36 and 37, and a bottom wall 38. A peripheral flange 39 leads around the end walls 34 and 35 and the side walls 36 and 37 for water tight attachment to the top half 30 of the hull 26. A reinforcing plate 40 is attached to the well bottom 38 and includes an apertured boss 41.

The ends of each cross member 22 and 23 have projections 42 and 43 formed by cutting away a portion of the opposite side walls of the cross members. The projections 42 and 43 have apertures aligned with the aperture in the boss 41. A pin 44 lies in the apertures of the extension 42 and 43 and the boss 41 and may be secured with a washer 45 and a cotter pin 46. The ends of the cross members are thus pivotally connected adjacent the bottom of the hulls.

Two such connections are shown on each hull 25 and 26 at the opposite ends of the cross members 22 and 23. Additional cross-members and pivotal connections may be used if desired. The cross members and pivotal connections may be located as desired lengthwise of the hulls. The well member 33 makes a water tight seal at the top of the hull so that when the hull is tilted, its water tight condition is maintained.

The cross members 22 and 23 are shown as one piece U-shaped members for clarity of illustration. However, they may be multiple piece members.

The deck 21 is bolted to the cross members 22 and 23. A seat 47 is secured on the deck 21 and a mast 48 is stepped in a socket 49 on the deck 21. A center structural member 50 lies under and is secured to the deck 21 as well as to the cross members 22 and 23. The member 50 may terminate forwardly in a bowsprit 51. An outboard motor hanger 52 is secured to the rear of the deck 21 and includes straps 53 and 54 bolted at one end to the deck 21. The other ends of the straps 53 and 54 are bolted to a motor board 55. A motor 56 may be clamped to the board 55 in the usual manner.

A housing 57 on the support 50 rotatably bearings a rudder shaft 58 which leads from a rudder 59 through the housing 57, the support 50, and the deck 21 to a tiller 60. The rudder 59 may be elevated from the position shown in FIG. 2 by pulling the tiller 60 upwardly so that the rudder 59 will clear obstructions under shallow water conditions.

Means are provided for selectably positioning and holding the pivotally mounted hulls 25 and 26 and include paired cable operating assemblies located under the deck 21 which are generally referred to by the reference numerals 62 and 63. Each cable operating assembly 62 and 63 consists of a bow bearing block 64 and stern bearing block 65 bolted to the deck 21. A tubular shaft 66 lies between the bearing blocks 64 and 65 and is equipped with a stop flange 67 and a male spline 69. Each shaft 66 also is equipped with at least one cable drum 70 and 71. Two drums are shown for ease of illustration and explanation.

A cable 72 leads from the drum 70 through a sheave 73 mounted on the cross members 22 and 23 above the hulls 25 and 26. The cable 72 leads from the sheave 73 to the starboard edge of the hulls 25 and 26 as at 74. A cable 75 leads from the drum 71 through the sheave 73 and is attached to the port edge of the hulls 25 and 26 as at 76.

The cable 72 and 75 are oppositely wound on the drums 70 and 71 respectively so that with shaft 66 rotation in one direction, one drum winds cable while the other drum unwinds cable. The sheave 73 has two rollers for convenience in handling the two cables 72 and 75.

Obviously a single drum may be used if desired. Also multiple drums can be used to operate multiple cable connections to the hulls if desired. Also, a single shaft can be used and the cables cross connected as is well understood in the rigging art.

A hub 77 is axially movably disposed on the shaft 66 and is equipped with a female spline 78 mated with the male spline 68. The hub 77 may slide aft on the shaft 66 to disengage the splines 68 and 78 as shown in FIG. 8 or it may slide forward to engage the splines as shown in FIGS. 2 and 9.

A lever 80 is attached to the hub 77 and extends upwardly through a suitable opening 81 in the deck 21. A bell-crank 82 is pivotally connected to the lever 80 at 83 and is pivotally connected to a rod 84 as at 85. The rod 84 extends downwardly through a guide 86 and a guide 87 to a pawl 88 which is equipped with a flange 89. A cogged sector 90 is bolted to the top of the deck 21 and has an arcuate conformation radially of the shaft 66. A spring 92 abuts the guide 86 at one end and the other end of the spring 92 abuts a collar 93 fixed on the rod 84. The spring 92 urges the pawl 88 downwardly under normal conditions toward engagement with the cogged sector 90.

By gripping the hand lever 80 and the bell-crank 82 and moving them together, the bell-crank 82 raises the rod 84 against the spring 92 to elevate the pawl 88 outwardly relative to the cogged sector 90.

In the position shown in FIGS. 1, 2 and 3, the lever 80 is in a vertical position with the pawl 88 engaging the cogged sector 90 with the flange 89 lying behind the cogged sector 90 preventing axial movement of the lever 80 and the hub 77 rearwardly on the shaft 66. This holds the splines 68 and 78 in engagement with the hub 77 abutting the stop flange 67 on the shaft 66. Also with the lever 80 in this position and condition, the hub 77 is held angularly stationary by the engagement of the pawl 88 with the cogged sector 90. This holds the shaft 66 against angular movement. This locks the drums 70 and 71 against angular movement holding the cables 72 and 75 stationary. The stationary cables 72 and 75 hold the hulls 25 and 26 stationary relative to the cross members 22 and 23 in the selected and adjusted position.

To permit free pivotal movement of the hulls 25 and 26 relative to the cross members 22 and 23, the operator grips the bell-crank 82 and lever 80 and forces the bell-crank 82 against the lever 80 to the position seen in FIG. 9. This elevates the pawl 88 and flange 89 out of engagement with the cogged sector 90. The operator then moves the lever 80 and the hub 77 towards the stern of the craft. This moves the mating splines 68 and 78 out of engagement as seen in FIG. 8. The shaft 66 is now free to turn and this allows free angular movement of the drums 70 and 71 and free winding and unwinding of the cables 72 and 75 relative to the drums. This allows free pivotal movement of the hulls 25 and 26 relative to the cross members 22 and 23.

When the stop flange 67 abuts the hub 77, the lever 80 and hub 77 are positioned relative to the stop flange 67 and both are positioned relative to the cogged sector 90 so that the grip flange 89 on the pawl 88 overlaps the cogged sector 90 and the pawl 88 is aligned with the cogged sector 90. When the stop flange 67 abuts the hub 77, the splines 68 and 78 are also engaged.

The locked condition of the hulls as previously described and illustrated in FIGS. 1–3 has advantages under some conditions such as when docking. The locked condition of the hulls hold them fixedly relative to the cross members against pivotal movement. This permits users to step on the hulls at any point without pivotal movement occurring. Thus, a steady safe foot support is provided.

In sailing, to tilt the hulls 25 and 26 and place them in angular position with keel effect for tacking under sail, the operator grasps the lever 80 compressing the bell-crank 82 and slides the hub 77 forwardly against the stop flange 67 on the shaft 66. This engages the splines 68 and 78 and locates the pawl 88 over the cogged sector 90 and the grip flange 89 behind the cogged sector 90.

The operator then moves the levers 80 to starboard in sailing on a starboard tack as seen in FIG. 10. He then releases the bell-crank 82 and the spring 92 moves the pawl 88 into engagement with the cogged sector 90 and positions the grip flange 89 behind the cogged sector 90 thereby locking the lever 80 both angularly and axially.

The rotational movement imparted to the shaft 66 by moving the levers 80 in a clockwise direction as seen in FIG. 10 rotates the drums 70 and 71 to wind in the cable 72 and to unwind the cable 75. This moves the hulls 25 and 26 to the positions of FIG. 10. This is the position for a starboard tack under sail propulsion. Here it is to be noted that the hulls are positioned substantially vertically and that the starboad hull depends into the water edgewise more deeply with the heel of the water craft under sail. This produces a keel effect preventing slide slip of the craft on the tack.

Upon going on a port tack, the levers 80 are moved from the positions illustrated in FIG. 10 to the positions illustrated in FIG. 11. This moves the drums 70 and 71 angularly in the opposite direction to that previously described relative to the starboard tack. This winds the cable 75 and unwinds the cable 72 on the drums pivoting the hulls 25 and 26 in the opposite angular direction until they assume the position illustrated in FIG. 11.

In running before the wind the hulls 25 and 26 may be locked in the planing position as illustrated in FIGS. 1–3 or the hulls may be allowed to pivot freely as illustrated in FIG. 8. Free pivotal position allows the hulls to rock with wave motion. The planing position of the hulls in running before the wind over the waves is advantageous as water resistance is mimimized.

In motor propulsion of the craft, the mast may be unstepped and the rigging removed if desired. After leaving the dock, the operator moves the lever 80 to the position of FIG. 8 with the hulls free to pivot relative to the cross members. Under straight ahead motor propulsion the hulls automatically assume a planing position and are adapted to pivot relative to the waved surface of the water to maintain their planing position relative to waves.

In turning under motor propulsion, the sideward motor thrust is delivered to the deck and cross members and then to the hulls via the pivotal connection adjacent the bottom of the hull.

In a turn to port under motor power, the motor 52 propeller is turned to starboard. The propeller exerts a starboard thrust at the rear of the craft 20 moving the rear of the craft 20 to starboard. Relatively, this moves the bow to port.

The starboard side thrust is delivered by the motor 52 to the deck 21 and the cross members 22 and 23. The side thrust of the cross members 22 and 23 is delivered to the pivotal connection at the pin 44 adjacent bottoms of the hulls 25 and 26. The bottoms 31 of the hulls 25 and 26 are thrust sidewardly so that bottoms 31 of the hulls move sidewise in one direction against opposed water resistance against the hulls 25 and 26 so that the tops 30 of the hulls move relatively sidewise in the opposite direction. Thus the hulls 25 and 26 assume a sidewise planing posture relative to the surface of the water in the turn to port.

In a turn to starboard under motor propulsion the opposite conditions obtain. The propelling turning force in turning to starboard moves the hull bottom portions to port and the water resistance moves the upper portion of the hull to starboard presenting the bottom of the hull at an angle to port as a planing angular surface relative to the surface of the water during the starboard turn.

Under sail propulsion in running before the wind or on reaches at a slight angle to the wind, the hulls may be allowed to pivot freely with the splines 68 and 78 disengaged as illustrated in FIG. 8. This allows the hulls to plane relative to the water and obviates the water resistance encountered with a deep hull or keel.

In operating under sail, on a starboard tack as illustrated in FIG. 10, the levers 80 are moved to starboard as illustrated so as to pivot the hulls 25 and 26 at an angle to port to present the hull bottom portions at a steep angle to starboard to gain a keel effect thereby preventing side slipping to starboard.

Under sail propulsion on a port tack, the levers 80 are moved to the position illustrated in FIG. 11 and this pivots the hulls 25 and 26 to starboard presenting their bottom portions to laterally abut the water with keel effect to prevent side slipping to port.

The hulls are preferably made of fiber glass and the well members 33, cross members 22 and 23, central reinforcement member 50, mast 66, bearing blocks 64 and 65, hubs 77 and other hardware portions are preferably made of aluminum or magnesium to provide strength and light weight. The rudder shaft housing 75 is also made of magnesium or aluminum as is the cogged sector 90 and the lever 80.

It is to be particularly noted that the contour of the hulls 25 and 26 is the same on the top as it is on the bottom. This allows the hull to present a streamlined conformation relative to the water in both the planing position and in the angular keel effect position illustrated in FIGS. 10 and 11. It is to be noted that the starboard hull on the starboard tack in FIG. 10 and the port hull on the port tack in FIG. 11 are substantially immersed and present both top and bottom to the water as they travel through the water.

It is to be particularly noted that the preferred hulls are shallow draft and that the device can be used with great facility in shallow water. It is to be further noted that the hulls may be positioned angularly as illustrated in FIGS. 10 and 11 to achieve a deep keel effect where desired. This provides the water craft operator with selectable options and gives him the advantage of both a shallow draft planing craft and a deep keel anti-side slipping sailing craft.

While the cross members 22 and 23 have been shown in definite positions for the purpose of illustration, their location is optional within the invention. The deck 21 may be extended forwardly and a cross member mounted between the hulls 25 and 26 adjacent their bows.

Although but a single embodiment of the invention has been shown and described in detail, it is obvious that many changes may be made in the size, shape, detail, and arrangement of the various elements of the invention within the scope of the appended claims.

I claim:
1. A water craft comprising,
   a first hull,
   a second hull spaced sidewise from said first hull,
   said hulls each having a bottom, first pivot members on said hulls adjacent said bottoms of said hulls, cross members spanning said hulls leading to a point adjacent said bottoms of said hulls, and second pivot members on said cross members engaging said first pivot members on said hulls pivotally connecting said cross members and said hulls at a point adjacent said bottoms of said hulls for rocking side to side pivotal movement of said hulls relative to said cross members and relative to water; cross member loads placed on said hulls being adjacent said bottoms of said hulls on said adjacent first pivot members providing said hulls with a low center of gravity relative to water displacement and buoyancy providing said hulls with self-stabilizing characteristics regardless of the height of the load above said hulls and the water.

2. In a device as set forth in claim 1, means for angularly canting said hulls relative to said cross members to locate said bottoms of said hulls sidewardly.

3. In a device as set forth in claim 2, said hulls having like tops and bottoms so that when disposed on edge, like surfaces are presented to water.

4. A water craft with flotation elements pivotally disposed for sidewise angular movement relative to the water craft and relative to water comprising, a first hull, a second hull, both said hulls having a bottom, said hulls lying side by side, cross members spanning said hulls, pivot members interconnecting said cross members and said hulls at a pivot point adjacent said bottom of said hulls providing said hulls with a low center of gravity loaded condition and self-stabilizing characteristics;

said hulls having a relatively shallow depth dimension and a relatively wide width dimension;

said hulls pivotally swinging relative to said cross members with wave motion;

sidewardly directed propelling force on said craft due to said low center of gravity load imposition being transmitted to said hulls adjacent said bottoms of said hulls urging said bottoms sidewardly in one direction in opposition to water resistance against said hulls in the opposite sideward direction;

both said propelling force and said opposite water resistance due to said low center of gravity load imposition combining to cause said hulls to pivot toward the propelling force and away from the water resistance thereby automatically assuming a favorable sidewise angular planing posture relative to the water.

5. In a device as set forth in claim 4, means for pivoting said hulls at an angle to position said hulls substantially on edge with said bottoms sidewardly in water to effect a keel like water resistance sidewardly for sailing at an angle to the wind.

6. In a device as set forth in claim 5, said hulls having opposite side edges, said means for pivoting said hulls comprising, a first cable attached to one side edge of each hull, a second cable attached to the other side edge of each said hull, and means for moving said cables in opposite directions.

7. In a device as set forth in claim 5, said hull having opposite sides:

said means for pivoting said hulls comprising, a first shaft lying parallel to said first hull, a second shaft lying parallel to said second hull, at least one drum on said first shaft and a least one drum on said second shaft, a cable oppositely wound on said drum on said first shaft having ends connected to said opposite side edges of one said hull, a cable oppositely wound on said drum on said second shaft having ends connected to said opposite side edges of said other hull, and means for rotating said shafts singly and in combination to angulate one or both said hulls as desired.

8. In a device as set forth in claim 7, each said shaft having a spline, a hub on each said shaft having a mating spline, and a lever on each said hub;

said levers said selectably engageable with said shafts through said splines.

9. In a device as set forth in claim 8, a spring pressed retractable pawl on said lever, a cogged sector arcuately disposed and fixed radially relative to said shaft, said pawl being engageable with said sector to hold said lever at an adjusted angular position, and a flange on said pawl locatable behind said section to hold said lever axially relative to said shaft to hold said splines in engaged position.

References Cited in the file of this patent

UNITED STATES PATENTS

| 1,705,303 | Nagy | Mar. 12, 1929 |
| 3,081,729 | Lee | Mar. 19, 1963 |
| 3,085,534 | Rabinow | Apr. 16, 1963 |

FOREIGN PATENTS

| 201,350 | Australia | Feb. 16, 1956 |